(12) United States Patent
Byun et al.

(10) Patent No.: US 10,382,174 B2
(45) Date of Patent: Aug. 13, 2019

(54) METHOD AND APPARATUS FOR INTER-CELL INTERFERENCE CANCELLATION IN WIRELESS COMMUNICATION SYSTEM

(71) Applicant: LG ELECTRONICS INC., Seoul (KR)

(72) Inventors: Daewook Byun, Seoul (KR); Jian Xu, Seoul (KR); Youngtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 15/329,221

(22) PCT Filed: Jul. 23, 2015

(86) PCT No.: PCT/KR2015/007687
§ 371 (c)(1),
(2) Date: Jan. 25, 2017

(87) PCT Pub. No.: WO2016/013889
PCT Pub. Date: Jan. 28, 2016

(65) Prior Publication Data
US 2017/0214501 A1      Jul. 27, 2017

Related U.S. Application Data

(60) Provisional application No. 62/028,814, filed on Jul. 25, 2014.

(51) Int. Cl.
*H04L 5/00* (2006.01)
*H04B 7/06* (2006.01)
(Continued)

(52) U.S. Cl.
CPC ......... *H04L 5/0032* (2013.01); *H04B 7/0469* (2013.01); *H04B 7/0617* (2013.01); *H04J 11/0056* (2013.01); *H04W 24/02* (2013.01)

(58) Field of Classification Search
CPC .......... H04B 7/04; H04B 7/06; H04B 7/0617; H04B 7/2121; H04B 7/2123; H04J 11/00;
(Continued)

(56) References Cited

U.S. PATENT DOCUMENTS

| 2006/0019694 | A1* | 1/2006 | Sutivong | ............... H04W 52/24 |
|---|---|---|---|---|
| | | | | 455/522 |
| 2008/0151832 | A1* | 6/2008 | Iwasaki | ............... H04W 52/243 |
| | | | | 370/330 |

(Continued)

FOREIGN PATENT DOCUMENTS

WO      2014102607      7/2014

*Primary Examiner* — Robert J Lopata
(74) *Attorney, Agent, or Firm* — Lee Hong Degerman Kang Waimey

(57) ABSTRACT

The present invention relates to a method and an apparatus for transmitting information among base stations for inter-cell interference cancellation in a massive MIMO or FD-MIMO system. A base station acquires interference area information, which is information on an area causing interference to a neighbor base station, and transmits the interference area information to the neighbor base station. The interference area information may include any one from among the vertical and horizontal angles of a beam causing interference to the neighbor base station, or the number of the area causing interference to the neighbor base station.

13 Claims, 12 Drawing Sheets

(51) Int. Cl.
*H04W 24/02* (2009.01)
*H04B 7/0456* (2017.01)
*H04J 11/00* (2006.01)

(58) Field of Classification Search
CPC .......... H04J 2203/0069; H04L 5/0032; H04W 24/02; H04W 72/04; H04W 72/12; H04W 76/00; H04Q 2213/394
USPC .......................................................... 370/329
See application file for complete search history.

(56) References Cited

U.S. PATENT DOCUMENTS

| | | | | |
|---|---|---|---|---|
| 2010/0099449 A1* | 4/2010 | Borran | ................ | H04W 52/243 455/501 |
| 2011/0014909 A1* | 1/2011 | Han | ..................... | H04J 11/0093 455/423 |
| 2011/0090861 A1* | 4/2011 | Kim | ................... | H04W 72/082 370/329 |
| 2011/0111766 A1 | 5/2011 | Yang et al. | | |
| 2011/0255514 A1* | 10/2011 | Olofsson | ........... | H04W 72/0426 370/331 |
| 2011/0305293 A1* | 12/2011 | Choi | .................. | H04W 72/082 375/285 |
| 2012/0021753 A1* | 1/2012 | Damnjanovic | ..... | H04W 72/082 455/450 |
| 2012/0108278 A1 | 5/2012 | Kim et al. | | |
| 2012/0140658 A1* | 6/2012 | Kanzaki | ............... | H04B 7/0426 370/252 |
| 2013/0017855 A1* | 1/2013 | Hui | ........................ | H04W 16/28 455/522 |
| 2013/0045771 A1* | 2/2013 | Martin | .................. | H04W 52/24 455/522 |
| 2013/0070625 A1* | 3/2013 | Fujishima | ............. | H04W 36/20 370/252 |
| 2013/0115999 A1* | 5/2013 | Sirotkin | ............... | H04B 7/0617 455/522 |
| 2013/0148528 A1* | 6/2013 | Ko | ........................ | H04W 24/02 370/252 |
| 2013/0194950 A1* | 8/2013 | Haghighat | ............ | H04W 24/02 370/252 |
| 2013/0329664 A1 | 12/2013 | Kim et al. | | |
| 2015/0195069 A1* | 7/2015 | Yi | ............................. | H04W 4/70 370/329 |
| 2015/0230189 A1* | 8/2015 | Chen | ................... | H04W 52/244 455/522 |
| 2016/0094323 A1* | 3/2016 | Kwak | .................. | H04L 5/0032 370/329 |
| 2016/0113022 A1* | 4/2016 | Tsutsui | ...................... | H04L 1/00 370/329 |
| 2016/0119847 A1* | 4/2016 | Park | .................. | H04W 36/0083 455/438 |
| 2016/0150548 A1* | 5/2016 | Wu | ........................ | H04W 24/02 370/329 |
| 2017/0105223 A1* | 4/2017 | Zhang | ................... | H04W 16/28 |

* cited by examiner

FIG. 3
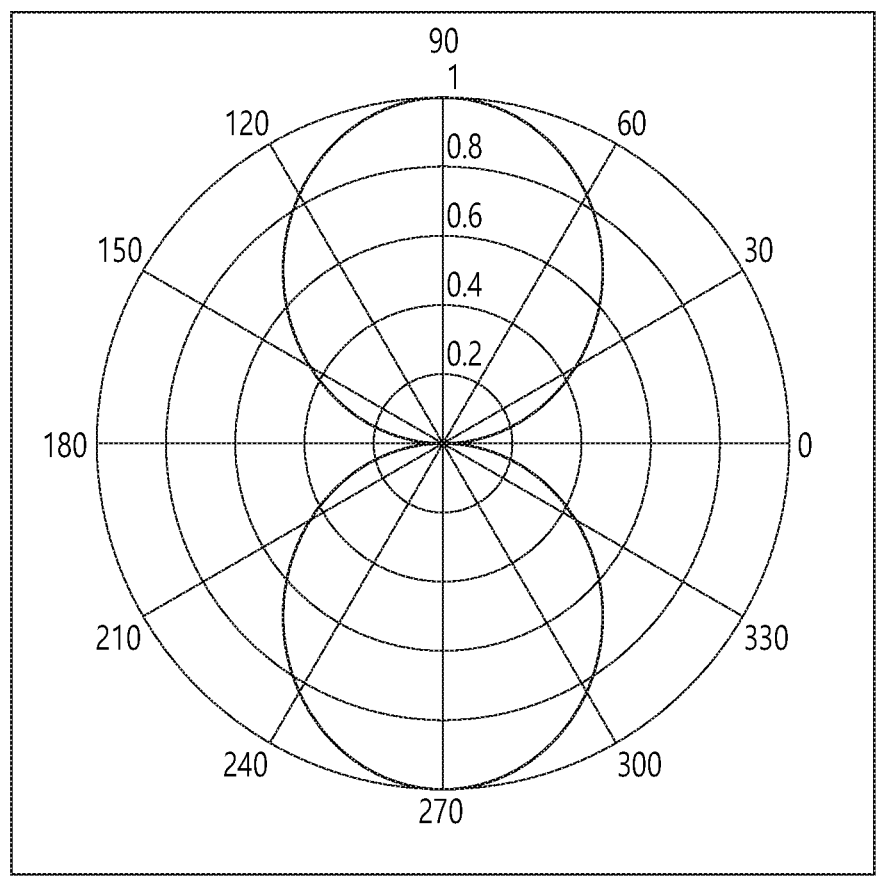
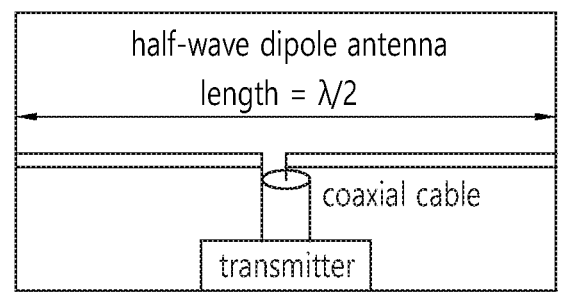

FIG. 4
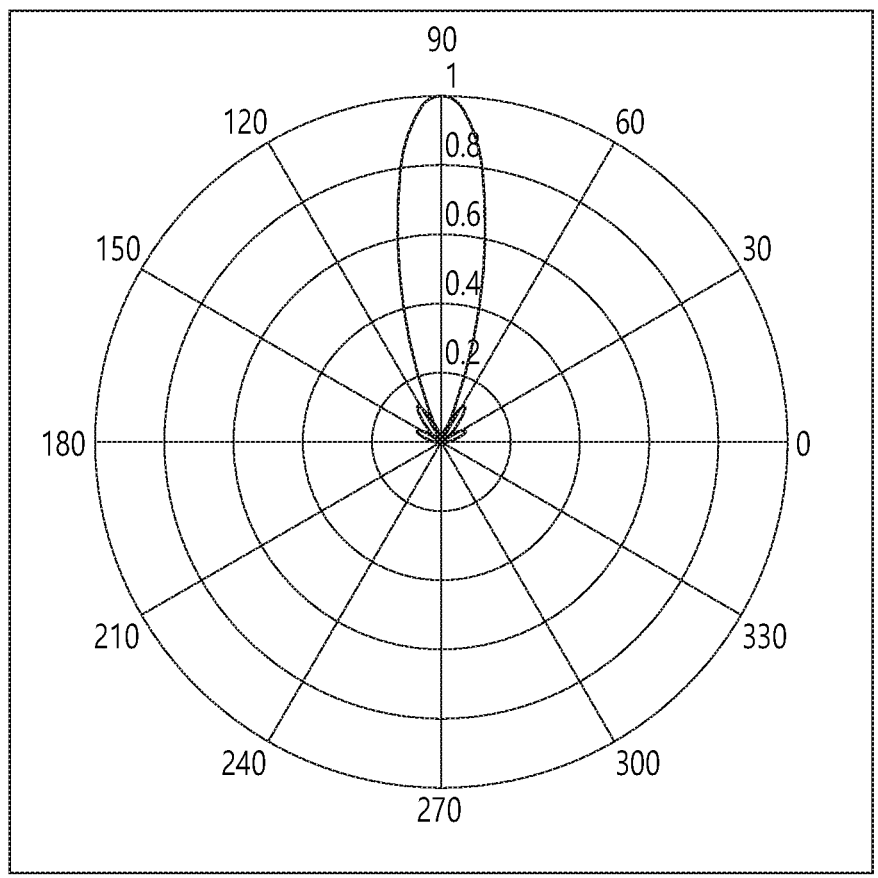
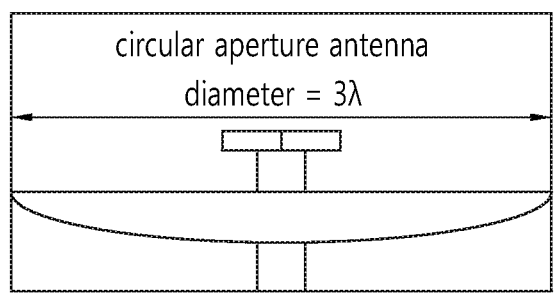

FIG. 5
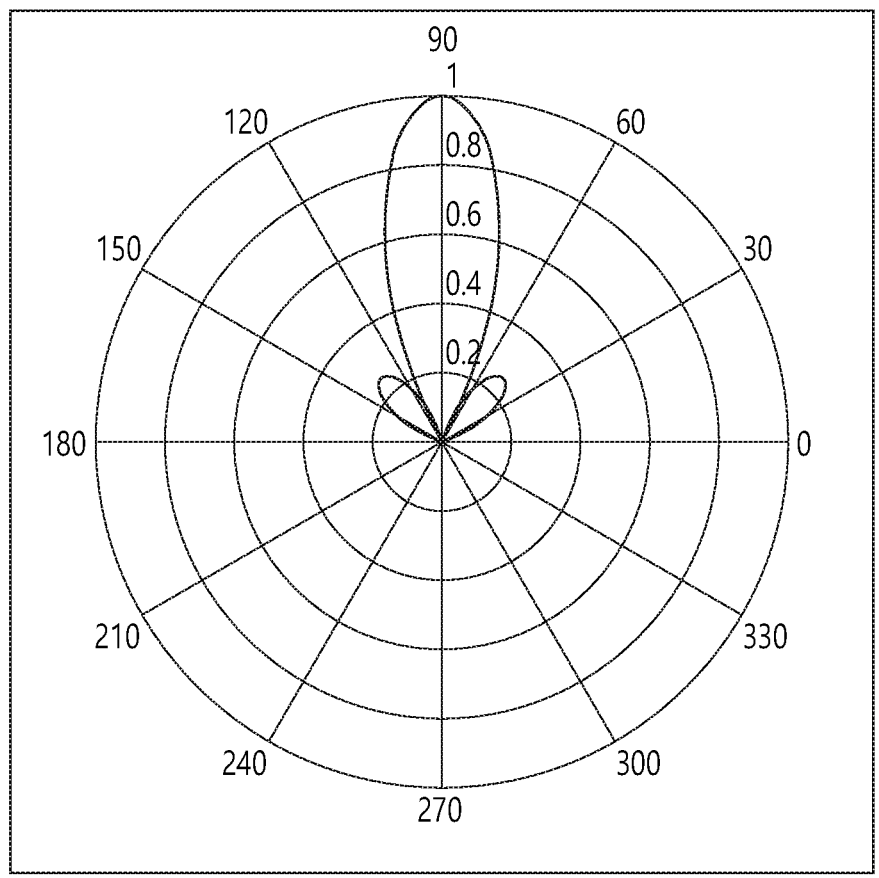
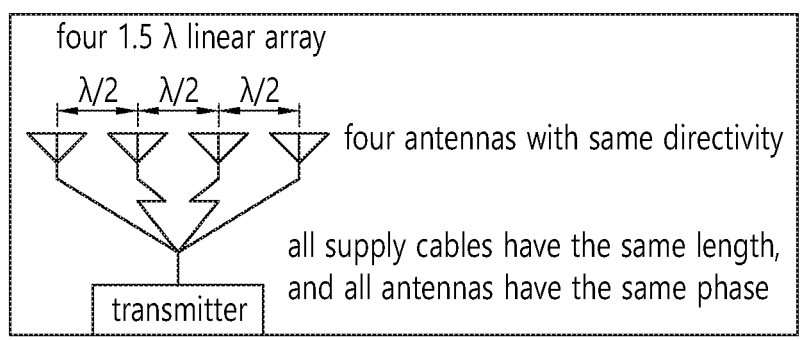

METHOD AND APPARATUS FOR INTER-CELL INTERFERENCE CANCELLATION IN WIRELESS COMMUNICATION SYSTEM

CROSS-REFERENCE TO RELATED APPLICATIONS

This application is the National Stage filing under 35 U.S.C. 371 of International Application No. PCT/KR2015/007687, filed on Jul. 23, 2015, which claims the benefit of U.S. Provisional Application No. 62/028,814, filed on Jul. 25, 2014, the contents of which are all hereby incorporated by reference herein in their entirety.

BACKGROUND OF THE INVENTION

Field of the Invention

The present invention relates to a method and apparatus for inter-cell interference cancellation, and more particularly, to a method and apparatus for transmitting information between base stations to cancel inter-cell interference in a massive multiple input multiple output (MIMO) system.

Related Art

A long term evolution (LTE) system is supported in earnest as a next-generation wireless communication system. The LTE system has been spread more rapidly than before ever since it was recognized that a large volume service with high quality is necessary at a user request as well as a voice service while ensuring activity of a user of a terminal. The LTE system provides a low transmission delay, a high transfer rate, a system capacity and coverage improvement, etc.

With an introduction of such a high quality service, there is a rapid increase in a demand on a wireless communication service. In order to actively cope with this situation, there is a need to increase a capacity of a communication system above anything else. A method of newly finding an available frequency band and a method of increasing efficiency on a limited resource may be considered as a way of increasing the communication capacity in a wireless communication environment.

For the method of increasing the efficiency on the limited resource, a multi-antenna transmission/reception technique has drawn a significant attention and has actively been developed in which a diversity gain is obtained by placing a plurality of antennas to a transceiver to additionally ensure a spatial area for utilizing a resource or in which a transmission capacity is increased by transmitting data in parallel through the respective antennas. In the multi-antenna system, beamforming and precoding may be used as a method of increasing a signal to noise ratio (SNR). The beamforming and the precoding are used to maximize the SNR through feedback information in a closed-loop system capable of using the feedback information in a transmitting end.

Massive multiple input multiple output (MIMO) is a multi-antenna technique intended to acquire high energy efficiency as well as a high transfer rate by placing a much larger number of antennas, that is, at least tens of antennas to a base station. The massive MIMO has been actively researched and thus has become one of the most attractive fields after releasing an initial research result on the massive MIMO in a TDD system, that is, after releasing a result in which, if a perfect channel vector can be obtained by using a uplink/downlink channel relation, inter-channel interference of different users is canceled when the number of antennas is increased, and thus several users can be concurrently served by using a simple transmission/reception filter. A proposal for improving performance of an LTE-advanced system was approved in 3GPP early in 2013 in such a manner that the number of antennas of a base station is increased and the existing horizontal direction 2D MIMO/beamforming is extended to vertical direction beamforming and full dimensional (FD)-MIMO (or 3D MIMO/beamforming). Accordingly, a 3D channel model for evaluating the vertical beamforming and FD-MIMO technique and an SI for defining an evaluation method are first carried out, and a standardization on the vertical beamforming and FD-MIMO technique is scheduled to be carried out after the previous task is complete.

SUMMARY OF THE INVENTION

The present invention provides a method and apparatus for transmitting inter-base station interference information to cancel inter-cell interference in a massive multiple input multiple output (MIMO) or full dimensional (FD)-MIMO communication system. A base station may transmit, to a neighboring base station, vertical and horizontal angles of a beam causing interference to the neighboring base station or a number of an area causing interference to the neighboring base station. The neighboring base station may schedule a terminal within a coverage of the neighboring base station on the basis of received information.

According to an embodiment, provided is a method of transmitting, by a base station to a neighboring base station, information regarding an area causing interference within a coverage of the neighboring base station. The method may include: acquiring interference area information as information regarding the area causing interference to the neighboring base station; and transmitting the interference area information to the neighboring base station.

The method may further include scheduling, by the neighboring base station, a terminal within the coverage of the neighboring base station on the basis of the interference area information.

The interference area information may be transmitted by being included in a load information message or another message.

The interference area information may include information regarding vertical and horizontal angles of a beam causing interference to the neighboring base station.

The method may further include transmitting height information of the base station and distance information (ISD; Inter Site Distance) between the base station and the neighboring base station.

The height information of the base station and the distance information between the base station and the neighboring base station may be transmitted upon X2 setup.

The information regarding the vertical and horizontal angles of the beam may include at least any one of a median value of a main lobe, a range value based on a beam width, and a range value indicating a width of one binding beam allocated to the terminal and a beam most similar thereto.

The interference area information may be transmitted per a PRB or per an interference area, or the interference area information may be transmitted by including information on the areas with the greatest interference within the coverage.

The interference area information may include an area number of an area causing interference to the neighboring base station among area numbers of the neighboring base station.

The area number of the neighboring base station may be a number of an area constituting an area of the neighboring base station and received by the neighboring base station from operations, administration and maintenance (OAM).

The method may further include receiving by the base station the area number of the neighboring base station through an X2 setup request message or an X2 setup response message.

The method may further include mapping by the base station the received area number of the neighboring base station to vertical and horizontal angles to be used for beamforming.

According to another embodiment, provided is a base station for transmitting, to a neighboring base station, information regarding an area causing interference within a coverage of the neighboring base station. The base station may include: a memory; a transceiver; and a processor for connecting the memory and the transceiver, wherein the processor is configured for: acquiring interference area information as information regarding the area causing interference to the neighboring base station; and transmitting the interference area information to the neighboring base station.

The interference area information may include information regarding vertical and horizontal angles of a beam causing interference to the neighboring base station.

The interference area information may include an area number of an area causing interference to the neighboring base station among area numbers of the neighboring base station.

In a massive multiple input multiple output (MIMO) or full dimensional (FD)-MIMO communication system, effective scheduling on a terminal within a coverage of a base station is possible by using inter-cell interference information provided from a neighboring base station.

BRIEF DESCRIPTION OF THE DRAWINGS

FIG. 3 illustrates a radiation pattern of a half-wave dipole antenna.

FIG. 4 illustrates a radiation pattern of a circular aperture antenna such as a satellite receiving antenna.

FIG. 5 illustrates a radiation pattern of a linear array antenna.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
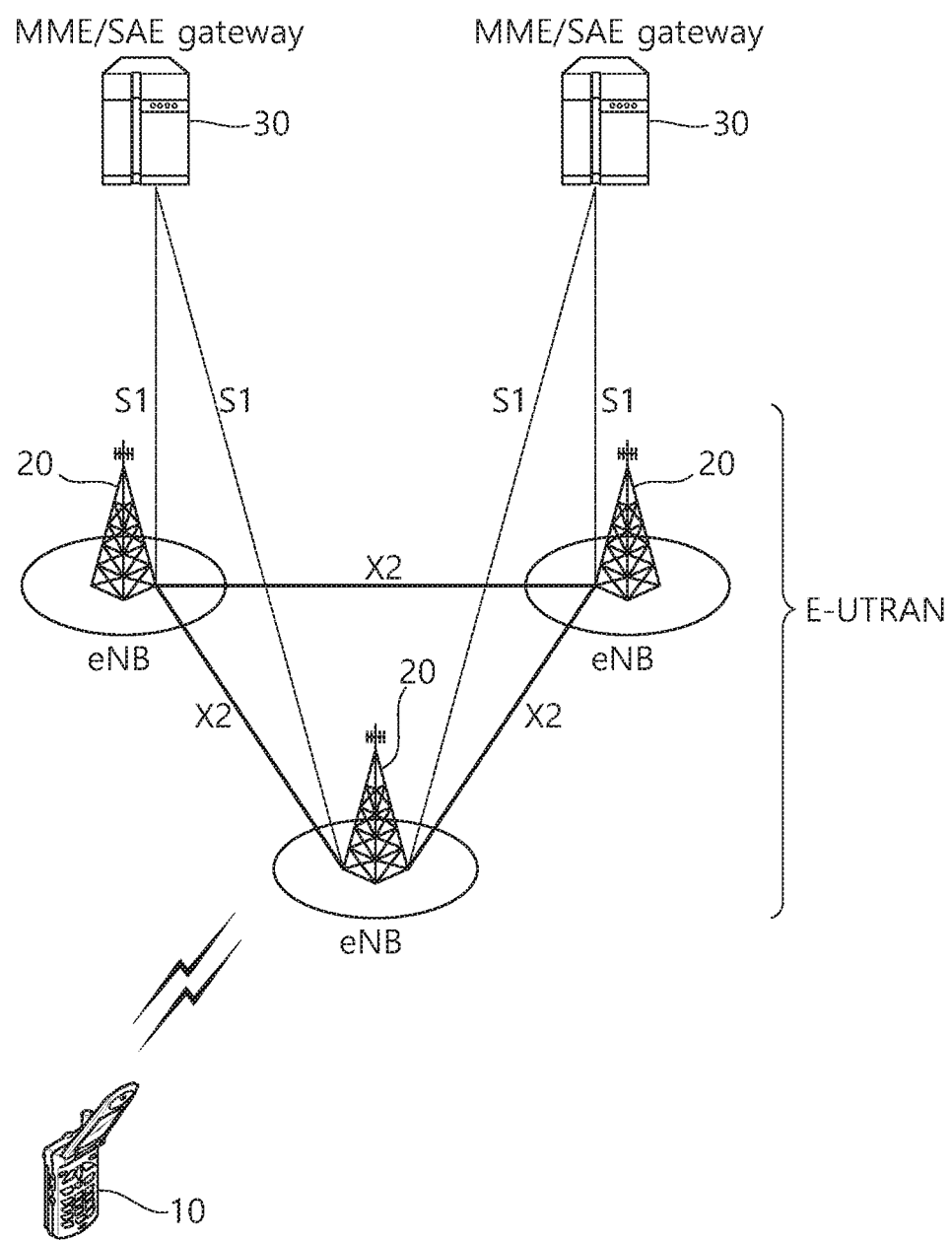
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

An EPC includes a mobility management entity (MME) and a system architecture evolution (SAE) gateway (S-GW). One or more MMEs/S-GWs 30 may be disposed at the end of a network and may be connected with an external network. For clarity, an MME/S-GW 30 may be simply referred to as a gateway hereinafter, in which it would be understood that the gateway includes both an MME and an S-GW.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface.

Figure 2:
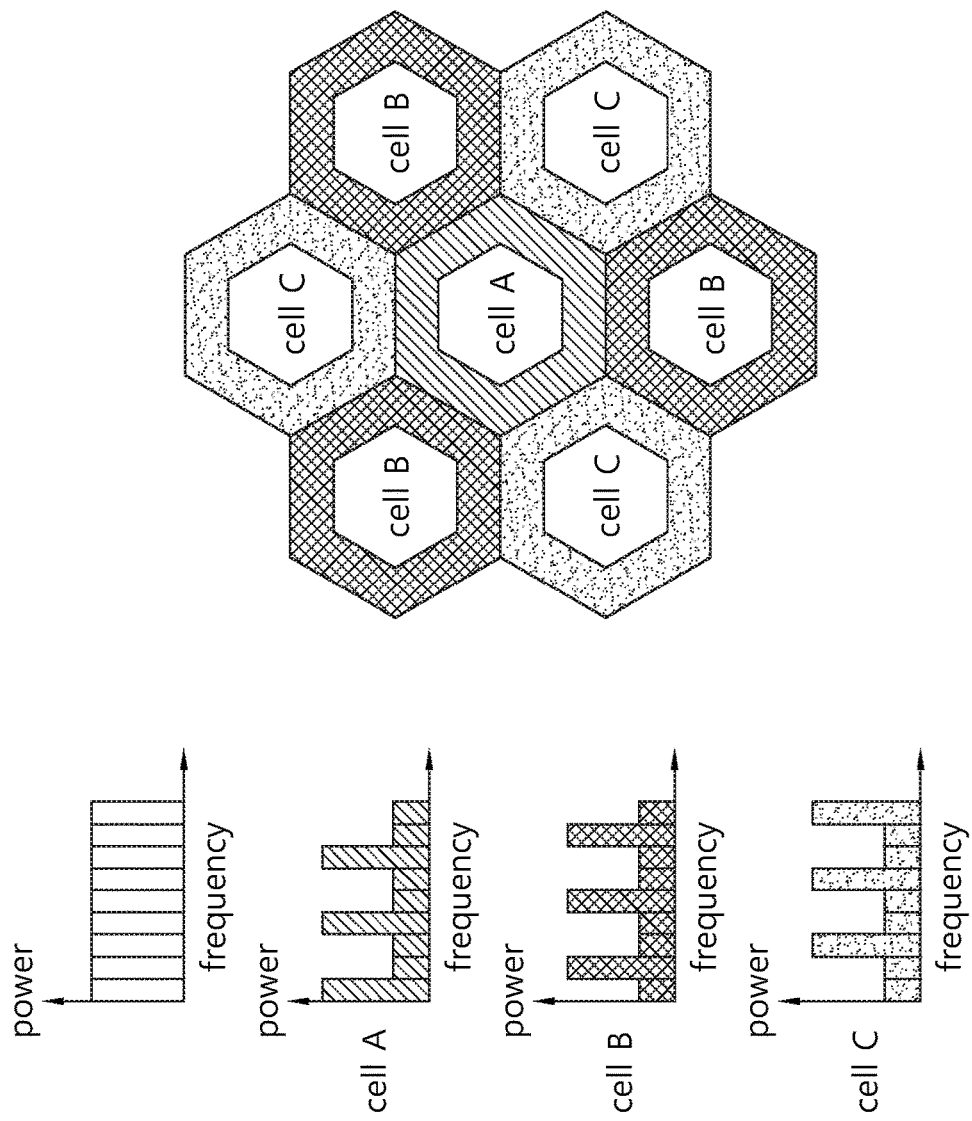
FIG. 2 illustrates an inter-cell interference coordination in an LTE system.

FIG. 2 illustrates an inter-cell interference coordination in an LTE system.

In an LTE system, each cell may be divided into an inner cell and an outer cell. In the inner cell in which a user experiences low-level interference and which requires low power even in communication with a serving cell, a frequency reuse factor is 1. In case of the outer cell, when the cell schedules the user in one part of a given band, system capacity may be optimized when neighboring cells transmit nothing or perhaps when the neighboring cell transmits low power to users existing inside the neighboring cells in order to avoid strong interference which may occur to a user scheduled in a first cell. Such a restriction results in an increase in the frequency reuse factor in a cell-edge, and this is known as a partial frequency reuse.

Referring to FIG. 2, each of cells A, B, and C may be divided into an inner area and an outer area, and a frequency resource for each cell-edge is assigned to a cell so as not to overlap with each other in a neighboring cell. If a specific frequency resource is allocated to an outer area of the cell A, the frequency resource is not allocated to the cell B and the cell C, and if a specific frequency resource is allocated to an outer area of the cell B, the frequency resource is not allocated to the cell A and the cell C. Similarly, if a specific frequency resource is allocated to an outer area of the cell C, the frequency resource is not allocated to the cell A and the cell B.

In order to adjust scheduling on different cells in this manner, communication is required between neighboring cells. If the neighboring cells are managed by the same base station (BS) (e.g., eNodeB), an adjusted scheduling plan may be performed without a request for standardized signaling. However, if the neighboring cells are controlled by different BSs, in particular, in case of multivendor networks, the standardized signaling is important.

In LTE, it is premised that an inter-cell interference coordination (ICIC) is managed by a frequency domain instead of a time domain, and signaling between BSs is designed to support this. This is because time domain adjustment may interrupt an operation for an HARQ process such as an uplink used in a synchronized hybrid automatic repeat request (HARQ).

For downlink transmission, a bitmap expressed by a relative narrowband transmit power (RNTP) indicator may be exchanged between BSs through an X2 interface. Each bit of the RNTP indicator corresponding to one resource block in the frequency domain is used to report to neighboring BSs whether a cell will maintain transmit power for the resource block to be below a specific upper limit. The upper limit and a valid duration of the indicator may be configured. For example, if the RNTP indicator is 1, it may indicate that transmit power is maintained to a specific resource block, that is, a signal is transmitted, and if the RNTP indicator is 0, it may indicate that a signal is not transmitted to the resource block, that is, beamforming is not performed. This allows to consider an interference level expected in each resource block when neighboring cells schedule a user in a cell. Upon receiving information indicating that transmit power of a resource block in a neighboring cell is high, a next operation of the BS is not identical. Therefore, a scheduling algorithm is executed with a certain degree of freedom. However, a typical operation may be for avoiding scheduling on a cell-edge user as to a resource block having high transmit power.

In the definition on the RNTP indicator, transmit power per antenna port may be normalized by using maximum output power of a BS or a cell. This is because a cell of which maximum output power is small due to its small size may be significantly interfered in comparison with a cell of which maximum output power is great in association with a cell having a large cell size.

A decision based on the RNTP indicator may be performed by Equation 1.

$$RNTP(n_{PRB}) = \begin{cases} 0 & \text{if } \frac{E_A(n_{PRB})}{E_{max\text{-}nom}^{(p)}} \leq RNTP_{threshold} \\ & \text{if no promise about the} \\ 1 & \text{upper limit of } \frac{E_A(n_{PRB})}{E_{max\text{-}nom}^{(p)}} \text{ is made} \end{cases} \quad \text{[Equation 1]}$$

In Equation 1, $E_A(n_{PRB})$ denotes the maximum intended energy per resource element (EPRE) of UE-specific physical downlink shared channel (PDSCH) resource elements (REs) for an orthogonal frequency division multiplexing (OFDM) symbol not including a reference signal (RS) in a physical resource block for an antenna port p during a next specific time duration, and $n_{PRB}$ denotes the number of resource blocks. $n_{PRB}$ may have a value from 0 to $N_{RB}^{DL}-1$. $RNTP_{threshold}$ may have a value belonging to $\{\infty, -11, -10, -9, -8, -7, -6, -5, -4, -3, -2, -1, 0, +1, +2, +3\}[dB]$ ($RNTR_{threshold} \in \{\infty, -11, -10, -9, -8, -7, -6, -5, -4, -3, -2, -1, 0, +1, +2, +3\}[dB]$).

Further, in Equation 1, $E^{(p)}_{max\text{-}nom}$ may be expressed by Equation 2.

$$E_{max\text{-}nom}^{(p)} = \frac{P_{max}^{(p)} \cdot \frac{1}{\Delta f}}{N_{RB}^{DL} \cdot N_{SC}^{RB}} \quad \text{[Equation 2]}$$

In Equation 2, Δf denotes a subcarrier spacing, $N_{RB}^{DL}$ denotes a downlink bandwidth configuration, $N_{SC}^{RB}$ denotes a resource block size in the frequency domain, expressed as the number of subcarriers.

According to Equation 1, an RNTP indicator is 0 if normalized RE energy ($E_A(n_{PRB})/E^{(P)}_{max-nom}$) is less than or equal to a pre-set $RNTP_{threshold}$, and is 1 if there is no regulation on an upper limit value of the normalized RE energy. That is, if the normalized RE energy is greater than $RNTP_{threshold}$, the RNTP indicator may be 1.

Meanwhile, a transmit antenna generates a strong electromagnetic wave in a specific direction in comparison with other directions. Indicating of field strength for the direction is called a radiation pattern of the antenna. The radiation pattern always has the same shape in reception and transmission.

An electromagnetic wave measured at a position separated far from the antenna corresponds to a sum of radiations radiated from all parts of the antenna. A small part of each antenna radiates a wave having a different width and phase, and a radiation wave travels by a different distance to a place in which a receiver is located. In the radiation wave, a gain may be increased in a certain direction, and may be decreased in a certain direction.

FIG. 3 illustrates a radiation pattern of a half-wave dipole antenna.

A half-wave dipole antenna is a simple half-way antenna in which a wire is connected to a disconnected central portion for cable connection. A directional antenna is designed to have gain in only one direction and to have loss in other directions. As an antenna increases in size, directivity thereof is created. A wave radiated from an antenna travels a long distance with directivity and may be more easily controlled when given a directional radiation pattern which is constructive interference or unconstructive interference.

FIG. 4 illustrates a radiation pattern of a circular aperture antenna, such as a satellite receiving antenna.

To be extremely simplified, a satellite receiving antenna is considered to be a circular surface from which the same electromagnetic waves are radiated in all parts. Referring to FIG. 4, a beam with a narrow width having a high gain is disposed at the center of the radiation pattern. As the diameter of the antenna increases according to a wavelength, the width of the central beam becomes gradually narrow. Small beams called side lobes appear on both sides of the central beam. The direction of a signal with a signal strength of 0 may be expressed as "nulls." A simple directional antenna is constructed from a linear array of small radiating antenna elements, and the same signal with the same amplitude and the same phase is provided from one transmitting end to each antenna element. As the entire width of the array increases, the central beam becomes narrow; as the number of antenna elements increases, side robes become small.

FIG. 5 illustrates a radiation pattern of a linear array antenna.

FIG. 5 shows a radiation pattern of four small antenna elements disposed at an interval of λ/2. The radiation pattern of the linear array may be represented by a radiation pattern of a single antenna multiplied by an array factor (AF) representing impact of constructive interference and destructive interference of each antenna signal. That is, the array factor represents a change in maximum antenna gain according to a beam width.

Figure 6:
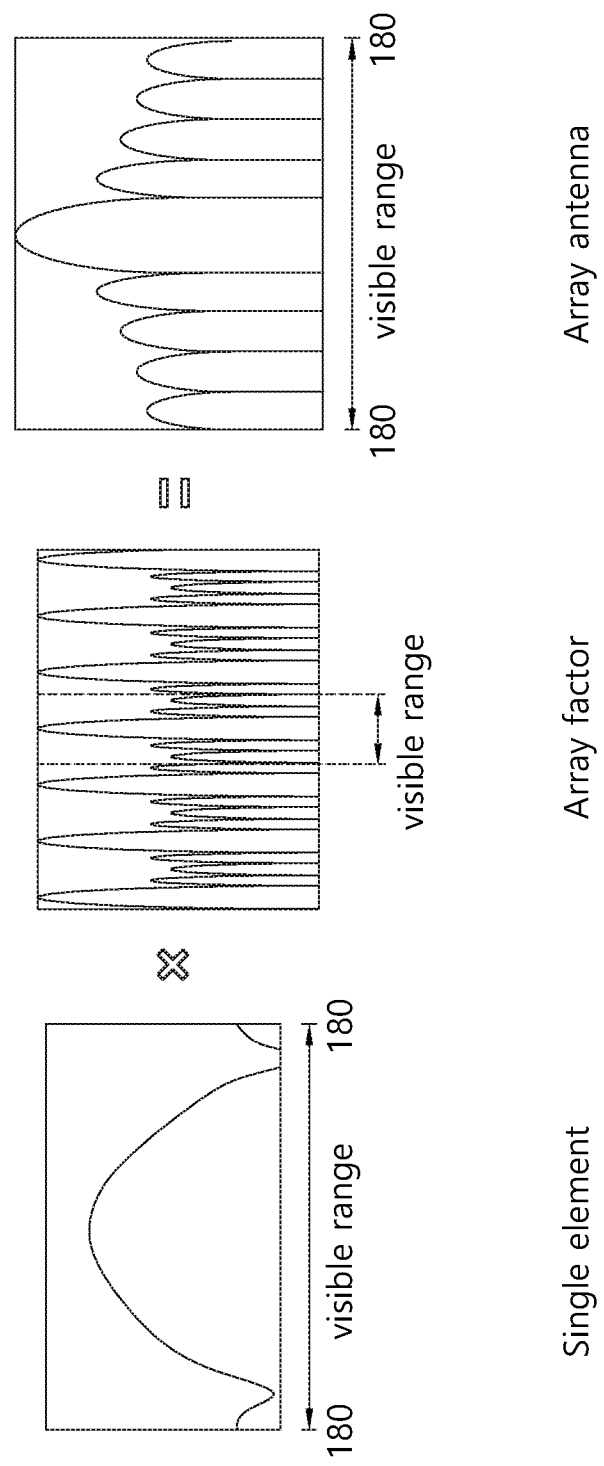
FIG. 6 illustrates a process of obtaining a radiation pattern of a linear array antenna.

FIG. 6 illustrates a process of obtaining a radiation pattern of a linear array antenna.

Referring to FIG. 6, an antenna gain may be obtained by multiplying a radiation pattern Er(ω) of a single antenna (single element) by an array factor. An array factor may be changed based on the number of antennas forming an antenna array, the distance between antennas, and a weight by which each antenna is multiplied. The array factor may be represented by Equation 1.

$$AF(\theta) = \sum_{n=1}^{NT} w_n e^{j(n-1)(kd\cos\theta + \phi)} \quad \text{[Equation 3]}$$

In Equation 3, NT denotes the number of antennas, wn denotes a weight for each antenna, d denotes the distance between antennas, $k=2\pi/\lambda$ denotes a wave number, θ denotes an angle from a directing point of an antenna array, and φ denotes a phase offset.

That is, when the heading direction (θ) of a beam from an antenna array is 0 and antennas are disposed at equal intervals, array factor values are expressed to be laterally symmetrical based on the heading direction. If a base station transmits a signal in a direction rotated through x degrees based on a boresight to which the antenna heads, an antenna gain at a directing point of a beam may be represented by Er(x)AF(0). Further, a beam gain at a point rotated through y degrees based on the directing point of the beam may be represented by Er(x+y)AF(y)

A window (vision region) of an AF may be shifted according to θ applied to the AF, and a final antenna gain is obtained by multiplying the window and a corresponding antenna radiation pattern.

Figure 7:
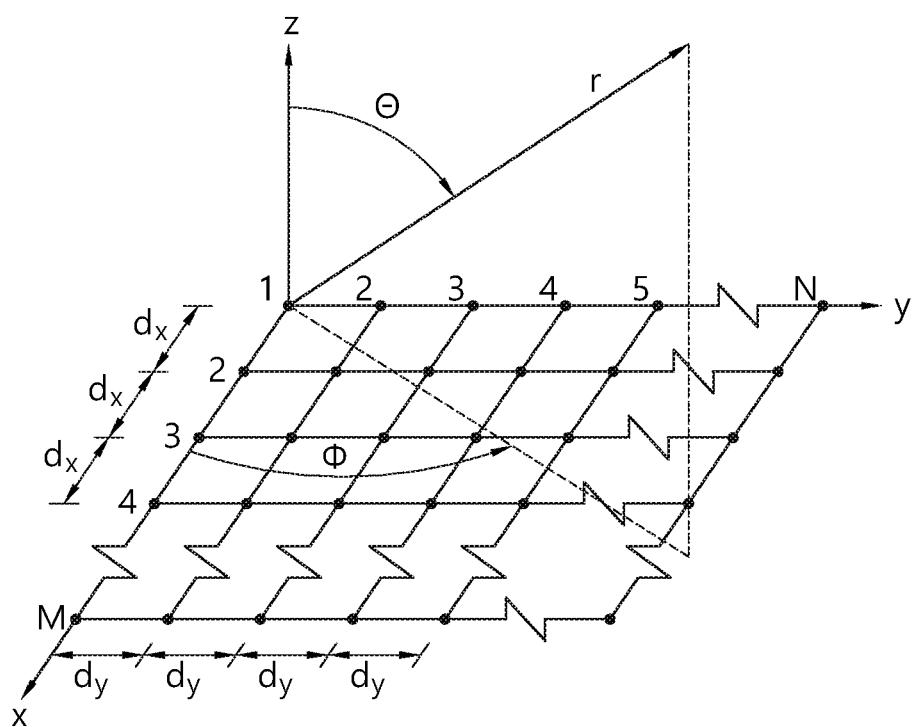
FIG. 7 illustrates an antenna array arranged in two dimensions.

FIG. 7 illustrates an antenna array arranged in two dimensions.

Referring to FIG. 7, antennas may be arranged at regular intervals in horizontal and vertical directions. θ denotes an azimuth angle, and φ denotes a vertical angle. dx and dy denote horizontal and vertical intervals between antenna elements. When antennas are arranged as in FIG. 7, AF may be represented by Equation 4.

$$AF(\theta,\phi) = AF_H(\theta,\phi) AF_V(\theta,\phi) \quad \text{[Equation 4]}$$

In Equation 4, AFH and AFV may be represented by Equation 5 and Equation 6, respectively.

$$AF_H(\theta,\phi) = \sum_{n=1}^{N} w_{1n} e^{j(n-1)(kd_y \sin\theta \sin\phi + \beta_y)} \quad \text{[Equation 5]}$$

$$AF_V(\theta,\phi) = \sum_{m=1}^{M} w_{m1} e^{j(m-1)(kd_x \sin\theta \cos\phi + \beta_x)} \quad \text{[Equation 6]}$$

Similarly, a radiation pattern of a single antenna may also be represented using parameters θ and φ by Er(θ,φ). Meanwhile, in a system, such as coordinated multipoint (CoMP) between base stations, base stations may exchange interference information and may perform user equipment (UE) scheduling based on the interference information.

Figure 8:
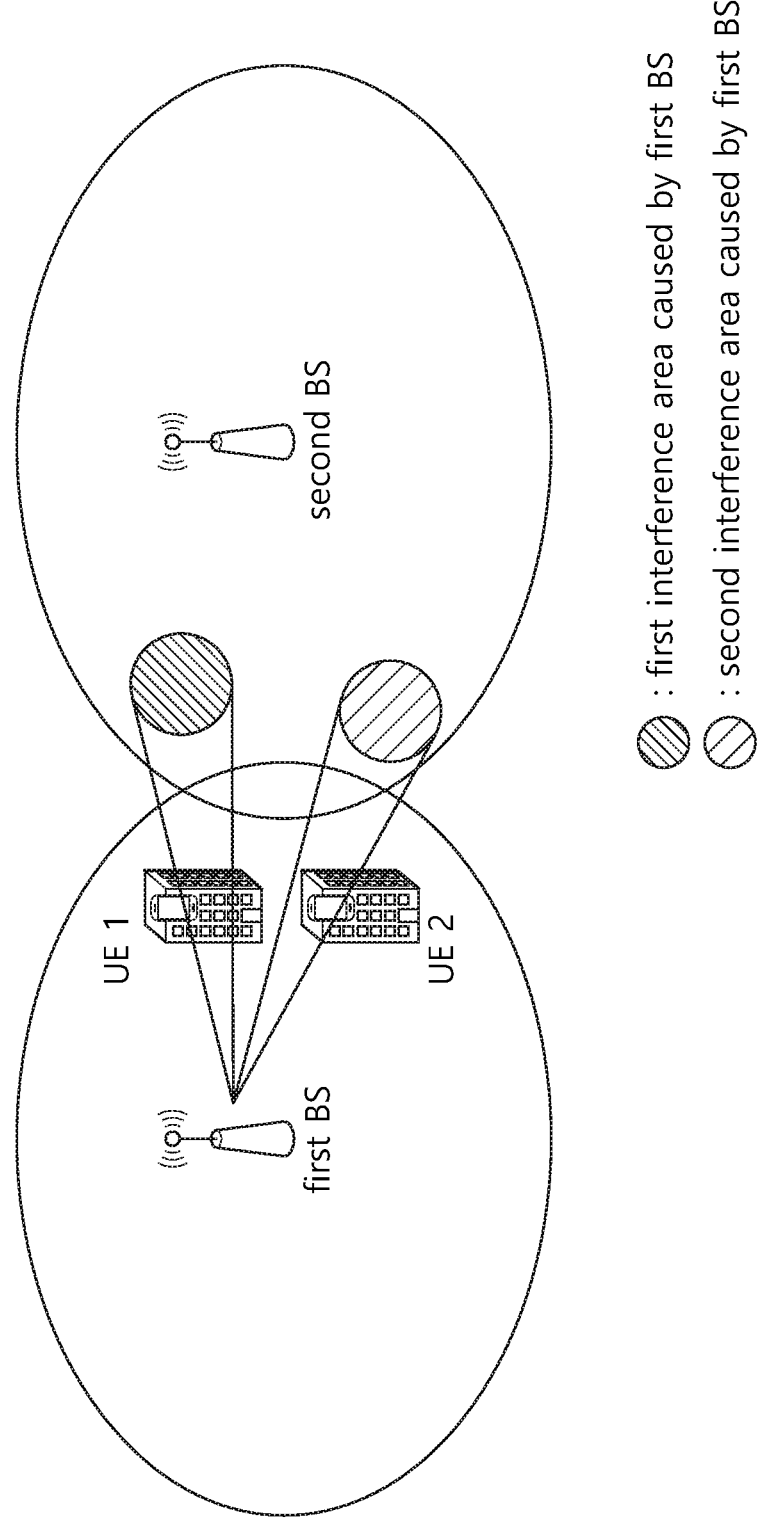
FIG. 8 illustrates inter-cell interference caused by a neighboring cell when using massive MIMO or FD-MIMO.

FIG. 8 illustrates inter-cell interference caused by a neighboring cell when using massive MIMO or FD-MIMO.

A massive MIMO technique is a technique for obtaining an increase in high energy efficiency in addition to an increase in high capacity by placing tens or hundreds of antennas to a BS to simultaneously support tens of users with the same resource. Although transmission efficiency can be significantly increased since the number of transmit antennas and users are increased in a multi-user MIMO technique, it is known that there are many difficulties in realization in practice due to a problem in that a complexity of a MIMO transmission/reception filter is also increased exponentially. On the other hand, the massive MIMO technique simplifies a system design by proposing a fact that, if a perfect channel vector can be obtained by using a uplink/downlink channel relation, inter-channel interference of different users is canceled when the number of antennas is increased, and thus several users can be concurrently served by using a simple transmission/reception filter.

In a cellular environment, inter-cell interference is generally greater in a cell-edge than in an inner cell. This is because an interference source exists in proximity. However, a UE existing inside a cell may also experience strong inter-cell interference if a full dimensional (FD)-MIMO or massive MIMO technique is introduced to improve system performance by using an antenna system having a 2D array structure for providing an adaptive control to both of an elevation dimension and an azimuth dimension. This is because UE-specific elevation beamforming is possible as shown in FIG. 8. Accordingly, the cell-edge may be less interfered from a first BS except for interference areas 1 and 2 of FIG. 8. If UEs are present in a cell-edge of a second BS, resources having a good channel state may be allocated to the UEs.

At present, the BS may use only a relative narrowband Tx power (RNTP) as information related to downlink interference from a neighboring BS. For a physical resource block (PRB), the RNTP indicates whether transmit power per PRB is higher than a specific threshold or not. Upon receiving this information, the neighboring BS may avoid being scheduled on a PRB indicated to have high transmit power. In other words, when using the existing RNTP information per PRB provided from the first BS at present, the second BS cannot know a location of the interference area of FIG. 8. Therefore, the second BS does not schedule the UEs in the cell-edge even if there is no interference from the first BS in the cell-edge other than the interference areas 1 and 2 of FIG. 8. The present invention proposes a method for solving this problem.

In the present invention, information indicating an interference area in a neighboring BS is defined as follows.

First information is vertical and horizontal angles of a beam allocated to a UE. The first information may be defined as at least one of a median value of a main lobe, a range value based on a beam width, and a range value indicating a width of one binding beam allocated to the UE and a beam most similar thereto. The first information may be used to allow a neighboring BS influenced by inter-cell interference to be able to confirm an interference area generated within its coverage.

Second information is an area number for dividing a coverage of a BS. This value may be pre-defined by operations, administration and maintenance (OAM). The BS may provide its area numbers to the neighboring BS. The area numbers received from the neighboring BS may be used to find an interference area of the neighboring BS. The area number may be allocated on the basis of vertical and horizontal angles used for beamforming to the UE within the coverage. For example, if the BS allocates the vertical and horizontal angles of the beam to the UE as 3° and 20° respectively, and if an area number of the neighboring BS related to those angles is 3, the BS may transmit a message including the area number 3 to the neighboring BS.

Figure 9:
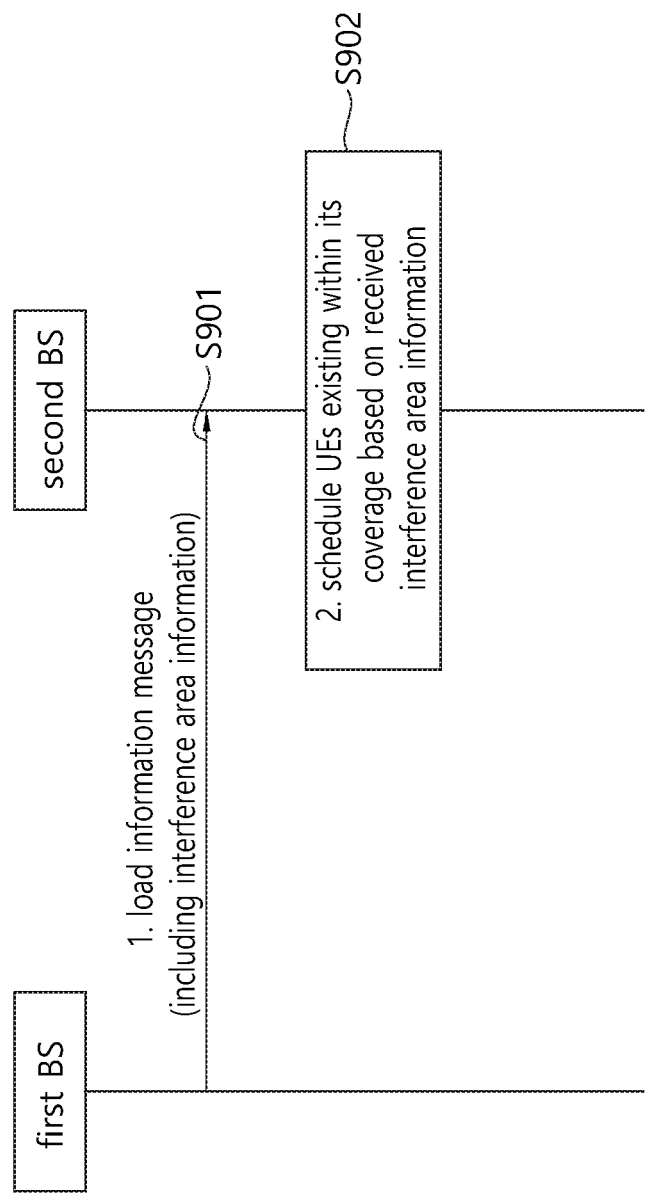
FIG. 9 illustrates a method of transmitting, to a neighboring cell, information of an area causing interference to the neighboring cell according to an embodiment of the present invention.

FIG. 9 illustrates a method of transmitting, to a neighboring cell, information of an area causing interference to the neighboring cell according to an embodiment of the present invention.

This method indicates an area of a neighboring BS influenced by inter-cell interference to the neighboring BS to perform scheduling for recognizing interference. This will be described below in greater detail with reference to FIG. 9.

A first BS may transmit a load information message including interference area information to a second BS (S901). This message may be transmitted either periodically or when an event is triggered. If the interference area information must be transmitted more frequently than when it is transmitted by using the message, a new message may be used to transmit the interference area information to the second BS. The interference area information included in the load information message may include angle information of a beam in which the first BS causes interference to the second BS. Further, the interference area information may include an area number of an area in which the first BS causes interference to the second BS. The second BS may use the distance information with the first BS and the height information of the first BS to determine the interference area within the coverage of the second BS using the angle of the beam received from the first BS, and the distance information with the first BS and the height information of the first BS may be received from the first BS during initial X2 setup. One of the followings may be used as the interference area information according to a transmitted format.

Providing in unit of PRB: Similarly to an RNTP IE per PRB in RNTP IE included in the load information message, the interference area information may be provided to the second BS for each PRB.

Providing in unit of interference area: Since the interference area may be identical for each PRB, the interference area and information regarding the number of PRBs indicating this may be provided to the second BS to decrease an information transmission amount.

Providing one interference area: Only an interference area to which UEs are allocated the most by the first BS may be transmitted to the second BS. That is, only information regarding an interference area regarded as an area having the most significant interference may be transmitted to the neighboring BS.

If the second BS receives the load information message including the interference area information, the second BS may know the interference area caused by the first BS in its coverage. Therefore, the second BS may schedule UEs not belonging to the interference area among UEs in its coverage on the basis of the received information, whereas scheduling on UEs belonging to the interference area may be avoided (S902).

Figure 10:
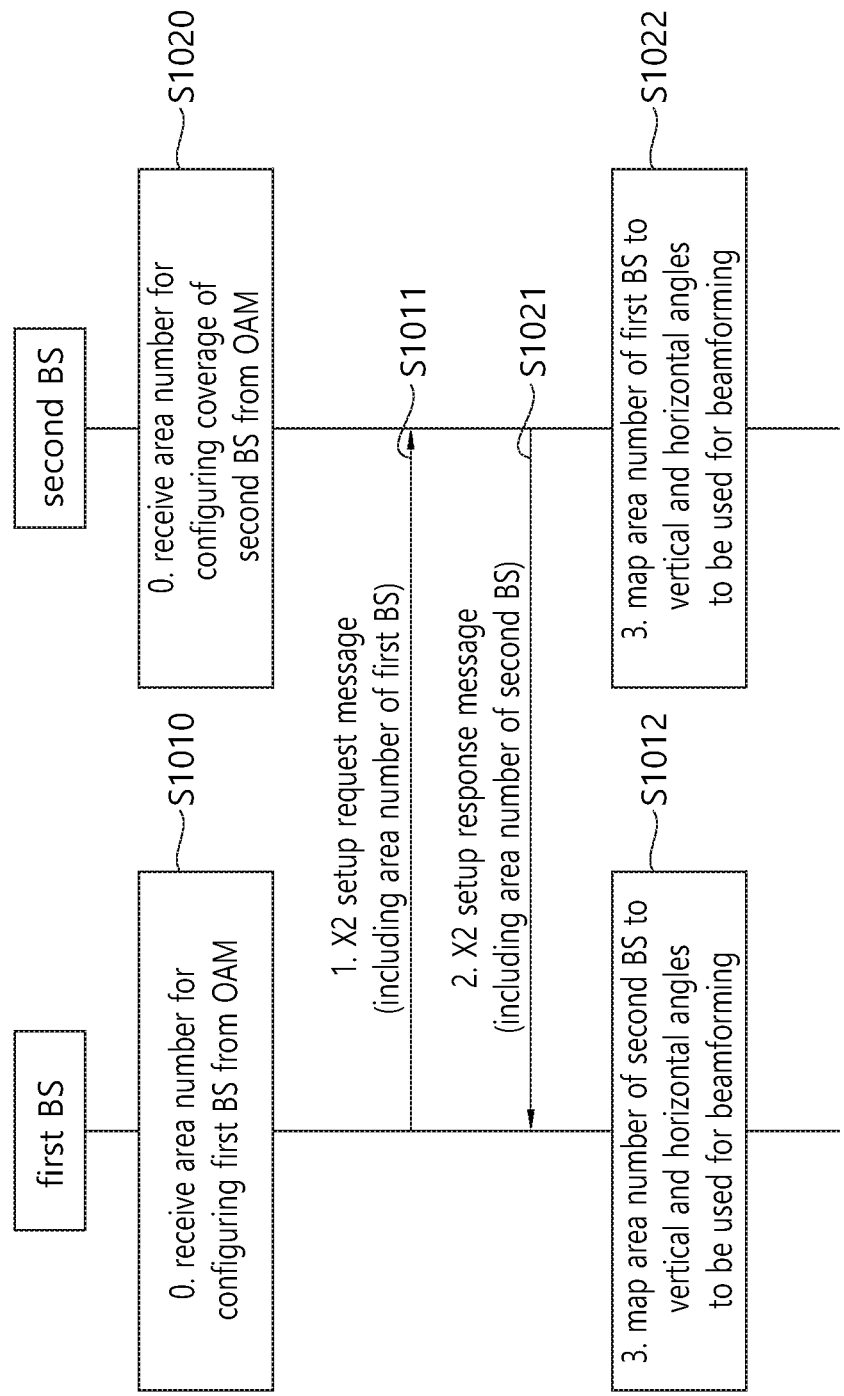
FIG. 10 illustrates a method of transmitting an area number of a pre-configured cell to a neighboring cell according to an embodiment of the present invention.

FIG. 10 illustrates a method of transmitting an area number of a pre-configured cell to a neighboring cell according to an embodiment of the present invention.

In the process of FIG. 9, if the second information (i.e., the area number for dividing the coverage of the BS) is used for the purpose of indicating an interference area generated by a first BS, a procedure proposed hereinafter must be complete. This procedure is used to indicate a pre-configured area number of each BS to the neighboring BS. This will be described below in greater detail with reference to FIG. 10.

Each BS may receive an area number from operations, administration and maintenance (OAM). That is, the first BS may receive an area number for configuring a coverage of the first BS from the OAM (S1010), and the second BS may receive an area number for configuring a coverage of the second BS from the OAM (S1020). The first BS may transmit an X2 setup request message including the area number of the first BS to the second BS (S1011), and the second BS may transmit an X2 setup response message including the area number of the second BS to the first BS in response to the X2 setup request message (S1021). Next, each BS may map an area number received from a neighboring BS to vertical and horizontal angles to be used for beamforming. That is, the first BS may map the area number of the second BS to the vertical and horizontal angles to be used for beamforming (S1012), and the second BS may map the area number of the first BS to the vertical and horizontal angles to be used for beamforming (S1022). When the proposed method is applied, the neighboring BS can confirm an area in which interference exists within its coverage by only transmitting to the neighboring BS a number of an area causing interference to the neighboring BS.

Figure 11:
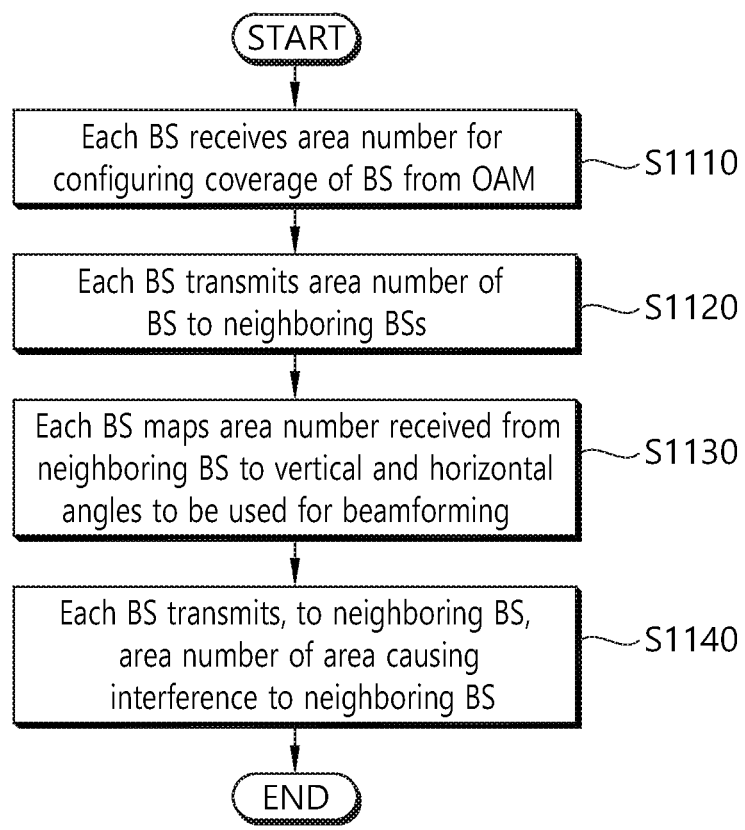
FIG. 11 is a block diagram illustrating a method of transmitting, to a neighboring cell, information of an area causing interference to a neighboring cell according to an embodiment of the present invention.

FIG. 11 is a block diagram illustrating a method of transmitting, to a neighboring cell, information of an area causing interference to a neighboring cell according to an embodiment of the present invention.

Referring to FIG. 11, each BS may receive an area number for constituting a coverage of the BS from OAM (S1110). Upon receiving the area number, each BS may transmit the received area number to neighboring BSs (S1120). The BSs may know an area number of the neighboring BS through this process. Each BS may map the area number received from the neighboring BS to vertical and horizontal angles to be used for beamforming (S1130). Each BS may transmit to the neighboring state an area number of an area causing interference to the neighboring BS, so that the neighboring BS does not schedule a UE in an interference area (S1140).

Figure 12:
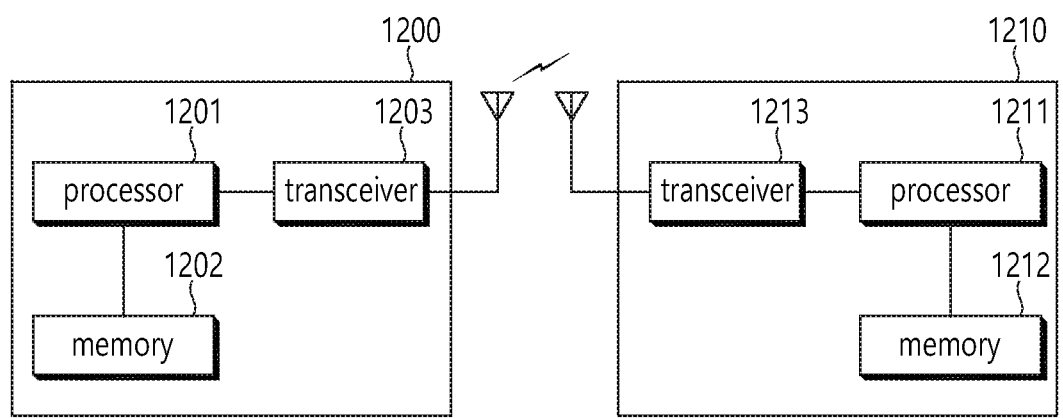
FIG. 12 is a block diagram illustrating a wireless communication system according to the embodiment of the present invention.

FIG. 12 is a block diagram illustrating a wireless communication system according to the embodiment of the present invention.

A BS 1200 includes a processor 1201, a memory 1202 and a transceiver 1203. The memory 1202 is connected to the processor 1201, and stores various information for driving the processor 1201. The transceiver 1203 is connected to the processor 1201, and transmits and/or receives radio signals. The processor 1201 implements proposed functions, processes and/or methods. In the above embodiment, an operation of the base station may be implemented by the processor 1201.

A UE 1210 includes a processor 1211, a memory 1212 and a transceiver 1213. The memory 1212 is connected to the processor 1211, and stores various information for driving the processor 1211. The transceiver 1213 is connected to the processor 1211, and transmits and/or receives radio signals. The processor 1211 implements proposed functions, processes and/or methods. In the above embodiment, an operation of the base station may be implemented by the processor 1211.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method of transmitting, by a base station to a neighboring base station, interference area information regarding an area causing interference within a coverage of the neighboring base station, the method comprising:
   receiving, by the base station, information on an index number of areas operated by the neighboring base station;
   determining, by the base station, information on vertical and horizontal angles of a beam causing interference to the neighboring base station;
   determining information on index number of interfered area by mapping the information on the index number of areas operated by the neighboring base station to the information on vertical and horizontal angles to be used for beamforming; and
   transmitting, by the base station to the neighboring base station, the interference area information including the information on index number of interfered area.

2. The method of claim 1, wherein the neighboring base station schedules a user equipment within the coverage of the neighboring base station, based on the interference area information.

3. The method of claim 1, wherein the interference area information is transmitted by being included in a load information message or another message.

4. The method of claim 1, further comprising:
   transmitting height information of the base station and distance information (ISD; Inter Site Distance) between the base station and the neighboring base station.

5. The method of claim 4, wherein the height information of the base station and the distance information between the base station and the neighboring base station are transmitted upon X2 setup.

6. The method of claim 1, wherein the information on the vertical and horizontal angles of the beam includes at least one of a center value of main lobe of the beam, a range value according to beam width, or a range value which represents width of one binding beam allocated to a UE and closest beams thereto.

7. The method of claim 1, wherein the interference area information is transmitted per a PRB or per the interfered area, or the interference area information is transmitted by including information on areas with the greatest interference within the coverage.

8. The method of claim 1, wherein the information on index number of interfered area represents an index number of an area causing interference to the neighboring base station among the index number of areas operated by the neighboring base station.

9. The method of claim 8,
wherein the information on an index number of areas operated by the neighboring base station is received from operations, administration and maintenance (OAM).

10. The method of claim 8, wherein the information on an index number of areas operated by the neighboring base station is received via an X2 setup request message or an X2 setup response message.

11. A base station for transmitting, to a neighboring base station, interference area information regarding an area causing interference within a coverage of the neighboring base station, the base station comprising:
   a memory;
   a transceiver configured to receive information on an index number of areas operated by the neighboring base station; and
   a processor, connected with the memory and the transceiver, and configured to:
      determine information on vertical and horizontal angles of a beam causing interference to the neighboring base station,
      determining information on index number of interfered area by mapping the information on the index number of areas operated by the neighboring base station to the information on vertical and horizontal angles to be used for beamforming; and
      transmit the interference area information including the information on index number of interfered area to the neighboring base station.

12. The base station of claim 11, wherein the information on index number of interfered area represents index number of an area causing interference to the neighboring base station among the index number of areas operated by the neighboring base station.

13. The base station of claim 11, wherein the neighboring base station schedules a user equipment within the coverage of the neighboring base station, based on the interference area information.

* * * * *